United States Patent
Yanagidate (10) Patent No.: US 10,935,099 B2
(45) Date of Patent: Mar. 2, 2021

(54) OUTBOARD ENGINE LIFTING/LOWERING DEVICE AND OUTBOARD ENGINE

(71) Applicant: Showa Corporation, Gyoda (JP)

(72) Inventor: Genki Yanagidate, Fukuroi (JP)

(73) Assignee: Showa Corporation, Gyoda (JP)

( * ) Notice: Subject to any disclaimer, the term of this patent is extended or adjusted under 35 U.S.C. 154(b) by 0 days.

(21) Appl. No.: 16/420,843

(22) Filed: May 23, 2019

(65) Prior Publication Data
US 2020/0248769 A1    Aug. 6, 2020

(30) Foreign Application Priority Data
Feb. 4, 2019    (JP) ............................ JP2019-017968

(51) Int. Cl.
*F16F 7/12*    (2006.01)
*B63H 20/10*    (2006.01)

(52) U.S. Cl.
CPC .............. *F16F 7/12* (2013.01); *B63H 20/10* (2013.01)

(58) Field of Classification Search
CPC ........ B63H 21/00; B63H 21/26; B63H 20/00; B63H 20/02; B63H 20/06; B63H 20/08; B63H 20/10; B63H 5/125; F16F 7/12
USPC .......... 440/53, 61 R, 61 T, 63, 61 D; 384/42
See application file for complete search history.

(56) References Cited

U.S. PATENT DOCUMENTS

| | | | | |
|---|---|---|---|---|
| 3,581,702 A * | 6/1971 | Moberg | ................. | B63H 20/10 440/61 R |
| 3,912,343 A * | 10/1975 | Paton | ....................... | B61F 5/14 384/423 |
| 4,720,278 A * | 1/1988 | Taguchi | ................. | B63H 20/10 440/61 R |
| 4,764,134 A * | 8/1988 | Watanabe | ............. | B63H 20/08 440/61 R |
| 5,597,333 A | 1/1997 | Soda | | |
| 6,071,157 A | 6/2000 | Yoshino et al. | | |
| 6,824,435 B2 * | 11/2004 | Divisi | ................... | B63H 20/10 440/61 T |
| 7,351,125 B2 * | 4/2008 | Ide | ...................... | B63H 20/106 440/61 T |

(Continued)

FOREIGN PATENT DOCUMENTS

JP    H04-254288 A    9/1992
JP    08-091298 A    4/1996

(Continued)

OTHER PUBLICATIONS

Japanese Office Action dated Nov. 5, 2019 for the corresponding Japanese Patent Application No. 2019-017968.

*Primary Examiner* — Lars A Olson
(74) *Attorney, Agent, or Firm* — Leason Ellis LLP (57) ABSTRACT

An outboard engine lifting/lowering device includes: a bracket which is to be rotatably provided to a hull and which is to be fixed to a propulsion device; and a rod unit which includes a tilt rod and a trim rod that are configured to rotate the propulsion device and the bracket. The bracket is provided with a receiving part configured to receive a tip end of the trim rod, and the receiving part includes: a buffer member made of a resin or rubber; and a contact member made of metal, which is provided on a surface of the buffer member at a side at which the trim rod is arranged, and which is in contact with the tip end of the trim rod.

10 Claims, 9 Drawing Sheets

(56) References Cited

U.S. PATENT DOCUMENTS

| | | | |
|---|---|---|---|
| 7,407,420 B2* | 8/2008 | Fetchko | B63H 20/10 440/61 T |
| 8,435,088 B2* | 5/2013 | Morettin | B63H 20/10 440/61 T |
| 9,033,752 B2* | 5/2015 | Takase | B63H 20/10 440/63 |
| 2006/0135007 A1 | 6/2006 | Ide et al. | |
| 2014/0199898 A1 | 7/2014 | Takase | |

FOREIGN PATENT DOCUMENTS

| JP | H11-227691 A | 8/1999 |
|---|---|---|
| JP | 2006-143066 A | 6/2006 |
| JP | 2014-136448 A | 7/2014 |

\* cited by examiner

OUTBOARD ENGINE LIFTING/LOWERING DEVICE AND OUTBOARD ENGINE

CROSS-REFERENCE TO RELATED APPLICATIONS

This application is based upon and claims the benefit of priority from prior Japanese patent application No. 2019-017968, filed on Feb. 4, 2019, the entire contents of which are incorporated herein by reference.

TECHNICAL FIELD

The present invention relates to an outboard engine lifting/lowering device and an outboard engine.

BACKGROUND ART

In a field of a hull, an outboard engine lifting/lowering device is available which includes a tilt cylinder for manly lifting an outboard engine above a water surface or lowering the same below the water surface and a trim cylinder for mainly changing an angle of the outboard engine below the water surface.

As a technology relating to the above device, for example, JP-A-H11-227691 discloses a trim device of a ship propulsion device where a propulsion device main body is vertically rotatably supported to a clamp bracket fixed to a hull, a load receiving part of the propulsion device main body is supported in contact with a trim rod of a trim cylinder provided to the clamp bracket, a trim angle of the propulsion device main body is controlled by expansion and contraction of the trim rod, the load receiving part of the propulsion device main body is provided with a thrust receiver facing a hemispherically convex tip end portion of the trim rod, and a surface of the thrust receiver facing the trim rod is attached thereon with a slide member formed with a hemispherically concave portion, with which the hemispherically convex tip end portion of the trim rod is in contact, and made of a synthetic resin having a low coefficient of friction.

Also, JP-A-H04-254288 discloses a trim/tilt device of an outboard engine that includes a clamp bracket attached to a hull, a swivel bracket provided to the clamp bracket so as to be rotatable about a tilt pivot and configured to support an outboard engine main body, a trim piston rod provided to the clamp bracket and configured to be linearly advanced and retreated toward the rear of the hull, and a trim pad provided to the swivel bracket and configured to be in contact with a tip end portion of the trim piston rod, and that is configured to perform a trim operation of the outboard engine main body by pushing and pulling the swivel bracket through the advance and retreat of the trim piston rod. In the trim/tilt device, a metallic end block is swingably provided to the tip end portion of the trim piston rod, at least a surface of the trim pad of the swivel bracket is made of a resin, the end block and the trim pad surface are contacted to each other in a flat surface contact manner, and a predetermined contact area or larger is always kept within a trim range.

In recent years, as a drive force increases so as to improve a propulsive force, a load more than ever tends to be applied to a contact part between the trim rod and the receiving part configured to receive the trim part, so that problems of strength and wear at the contact part and occurrence of a sound upon contact become marked.

The present disclosure relates to provide an outboard engine lifting/lowering device and the like capable of suppressing a sound to be generated upon contact over a long time while securing strength and wear resistance at a contact part between a tip end of a trim rod and a receiving part.

SUMMARY OF INVENTION

According to an aspect of the present disclosure, there is provided an outboard engine lifting/lowering device comprising: a bracket which is to be rotatably provided to a hull and which is to be fixed to a propulsion device; and a rod unit which includes a tilt rod and a trim rod that are configured to rotate the propulsion device and the bracket, wherein the bracket is provided with a receiving part configured to receive a tip end of the trim rod, and the receiving part includes: a buffer member made of a resin or rubber; and a contact member made of metal, which is provided on a surface of the buffer member at a side at which the trim rod is arranged, and which is in contact with the tip end of the trim rod.

DESCRIPTION OF EMBODIMENTS

Hereinafter, a variety of exemplary embodiments will be described with reference to the drawings.

Figure 9:
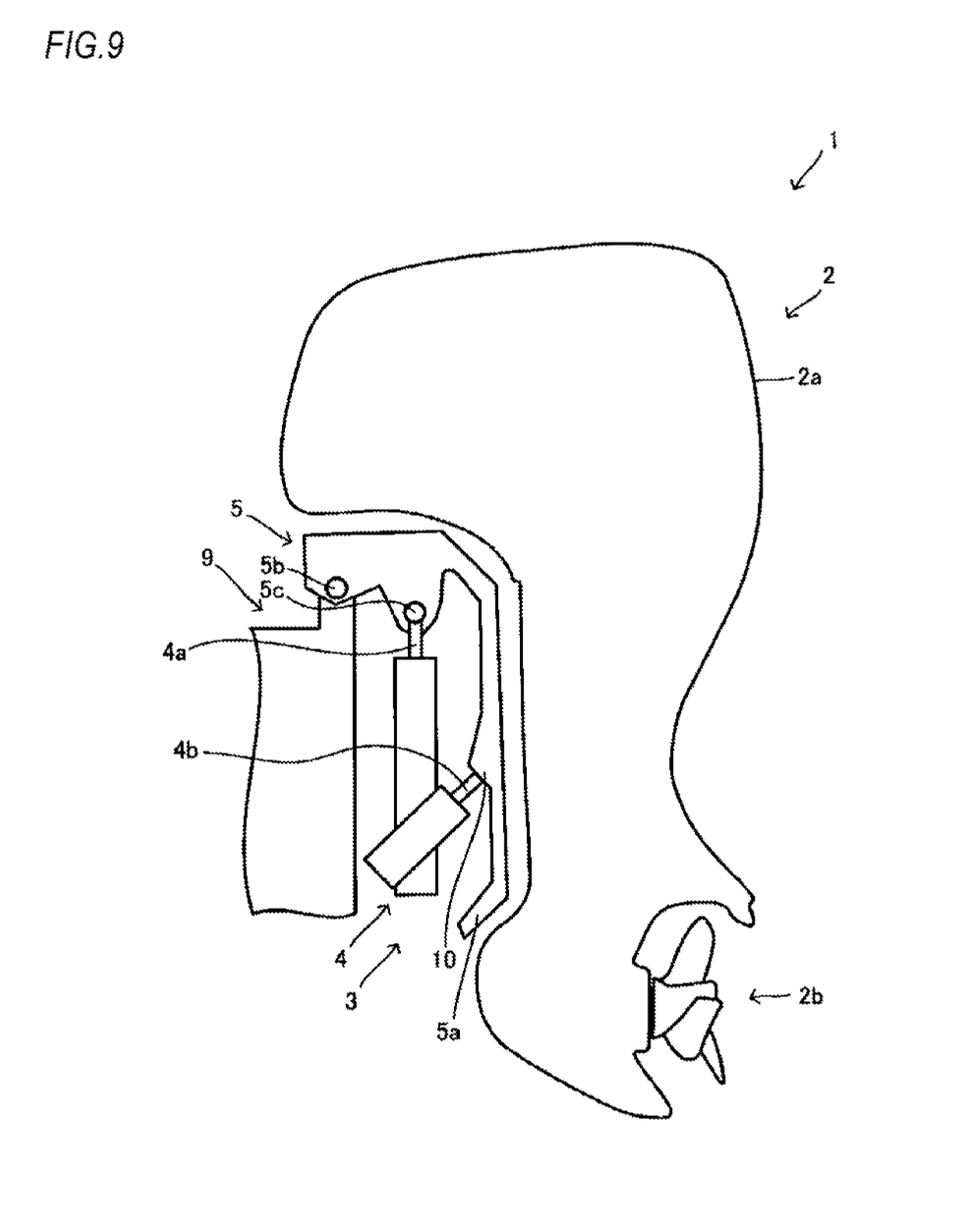
FIG. 9 illustrates a basic structure of an outboard engine.
Figure 10:
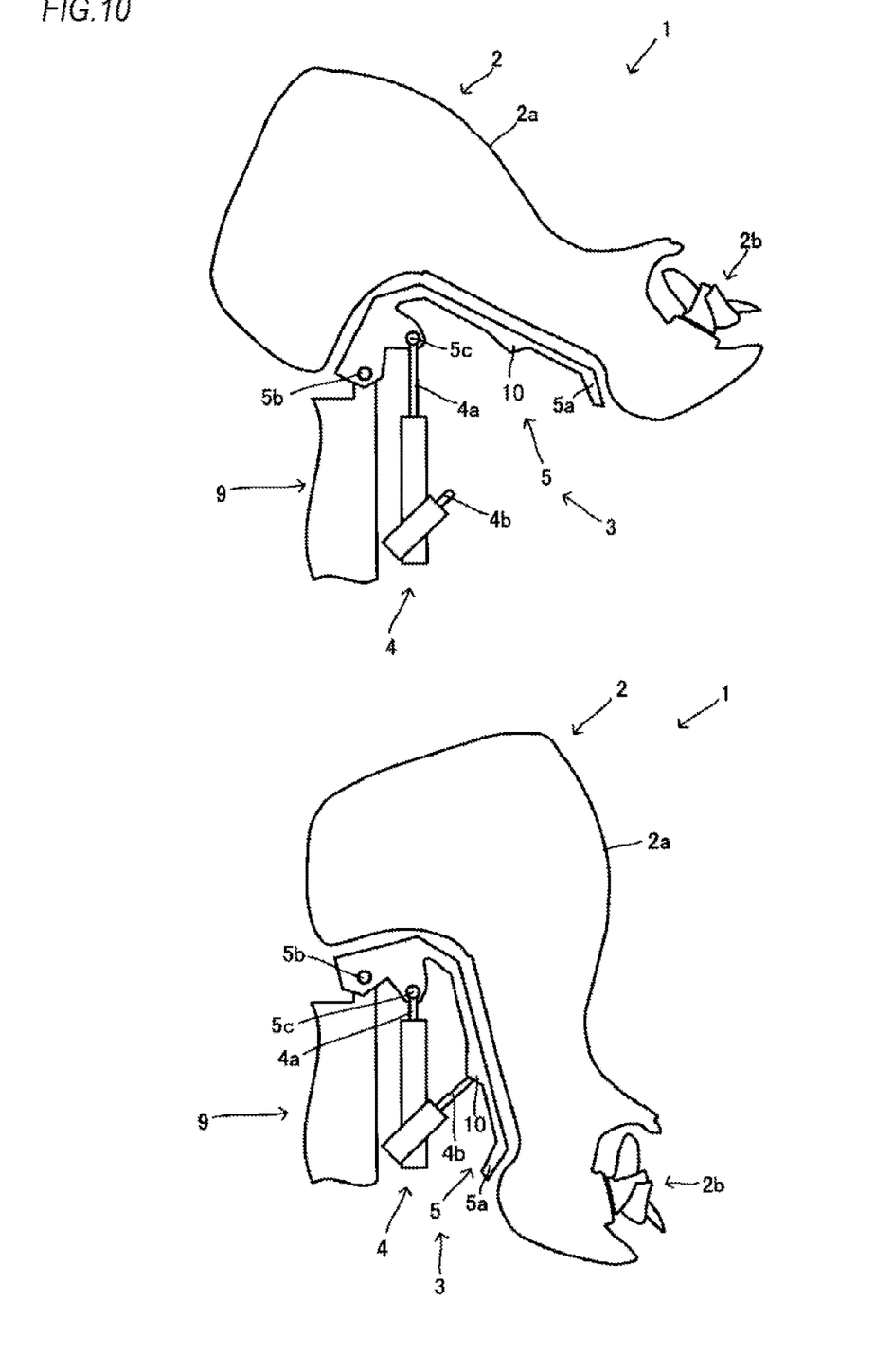
FIG. 10 illustrates postures upon the tilt and trim.

FIGS. 9 and 10 illustrate an outline of an outboard engine 1. As can be seen from the drawings, the outboard engine 1 includes a propulsion device 2 and an outboard engine lifting/lowering device 3.

The propulsion device 2 is a device configured to apply a propulsive force to a hull 9 (a part of a stern of the hull 9 is shown in FIGS. 9 and 10), and necessary members are arranged inside and outside a housing 2a. For example, a drive source such as an internal combustion engine (engine) is arranged at an upper part of an inner side of the housing 2a, and a propeller 2b is arranged at a lower part of an outer side of the housing 2a. The hull 9 is applied with the propulsive force by rotation of the propeller 2b. For this reason, a shaft and diverse gears for transmitting an appropriate rotary force from the drive source to the propeller 2b are accommodated inside the housing 2a of the propulsion device 2.

The outboard engine lifting/lowering device 3 is a device for changing a posture of the propulsion device 2, and is configured to rotate the propulsion device 2 about an upper side of the propulsion device 2, thereby lifting/lowering a lower side of the propulsion device 2.

The lifting/lowering by the rotation of the propulsion device 2 is classified into two types of tilt and trim, depending on a difference of degrees of the lifting/lowering (rotating angles). The tilt is lifting/lowering for rotating the propeller 2b to reach a position above a water surface. In contrast, the trim is lifting/lowering by rotation of changing an angle of the propulsion device 2 with the propeller 2b being left in the water.

For the tilt and the trim, the outboard engine lifting/lowering device 3 is provided with a rod unit 4 and a bracket 5.

The rod unit 4 is arranged at the stern of the hull 9, and includes at least two types of rods. One is a tilt rod 4a that is a rod-shaped member for tilt, and the other is a trim rod 4b that is a rod-shaped member for trim.

The tilt rod 4a is configured to be vertically moved at a posture where the outboard engine 1 is mounted to the stern of the hull 9. In contrast, the trim rod 4b is configured to be advanced obliquely upward in a direction of getting away from the hull 9 and to be retreated in an opposite direction thereto at the posture where the outboard engine 1 is mounted to the stern of the hull 9. Usually, the trim rod 4b is provided at each of one side and the other side in a horizontal direction with the tilt rod 4a being interposed therebetween.

The bracket 5 is a member configured to transmit pressing forces from the tilt rod 4a and the trim rod 4b to the propulsion device 2, thereby rotating the propulsion device 2 by a desired angle and lifting/lowering the same.

The bracket 5 has a main body 5a that is a structure for configuring a link mechanism for obtaining the desired rotation. The main body 5a is attached to a surface of the propulsion device 2, which faces toward the stern, and one end thereof is rotatably attached to the stern (hull-attached part 5b). Also, a tip end of the tilt rod 4a is attached to a position of the main body 5a distant from the hull-attached part 5b (tilt rod-attached part 5c). Thereby, as shown in the upper part of FIG. 10, when the tilt rod 4a is lifted, the tilt rod-attached part 5c is lifted, so that the main body 5a and the propulsion device 2 attached to the main body 5a are rotated about the hull-attached part 5b and the tilt is thus performed.

In the meantime, the bracket 5 and the trim rod 4b are not fixed and are instead configured so that the tip end of the trim rod 4b can be brought into contact with or separated from the main body 5a of the bracket 5 by the posture of the propulsion device 2. To this end, the main body 5a of the bracket 5 is provided with a receiving part 10 that is a part with which the tip end of the trim rod 4b is to be brought into contact. Usually, the receiving part 10 is arranged below the tilt rod-attached part 5c.

As shown in the lower part of FIG. 10, when the tip end of the trim rod 4b is moved in a direction of getting away from the stern with the tip end of the trim rod 4b being in contact with the receiving part 10, the main body 5a and the propulsion device 2 attached to the main body 5a are rotated about the hull-attached part 5b, in conformity to the movement of the trim rod 4b, so that the trim is performed.

The basic structures of the outboard engine and the outboard engine lifting/lowering device provided thereto are as described above and are common in the respective exemplary embodiments to be described later. In the below, configurations except the parts common to the respective exemplary embodiments are shown and described. When describing the configurations, FIGS. 9 and 10 are also referred to and the reference numerals shown therein are used.

Figure 1:
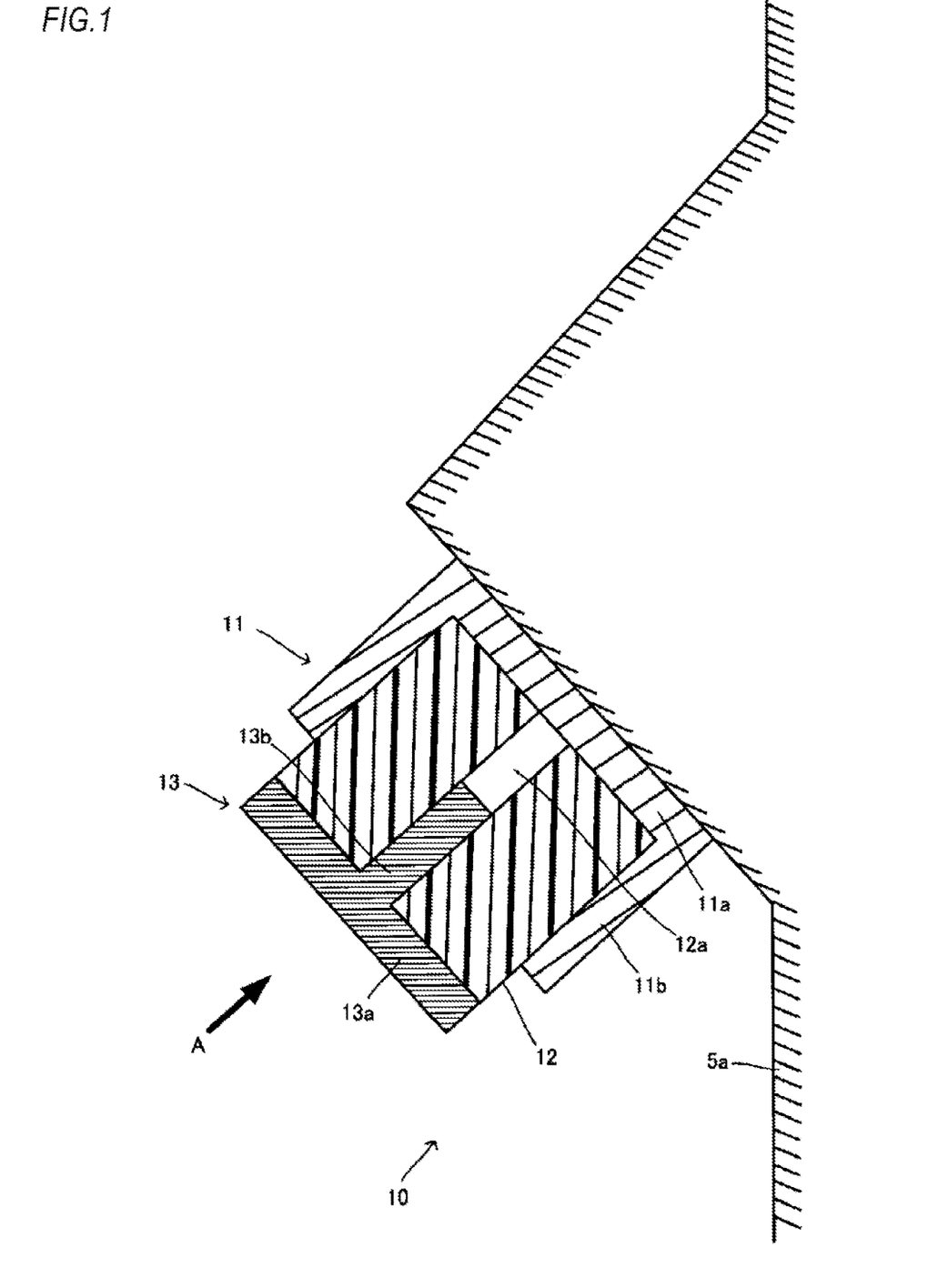
FIG. 1 is a sectional view of a receiving part 10 in a first exemplary embodiment.

FIG. 1 illustrates the receiving part 10 provided to the outboard engine lifting/lowering device of a first exemplary embodiment and is an enlarged view of the receiving part 10 of the bracket 5 provided to the outboard engine lifting/lowering device 3. FIG. 1 is a sectional view of the receiving part 10, and FIG. 2 depicts the receiving part 10, as seen from a direction of an arrow A in FIG. 1.

Figure 2:
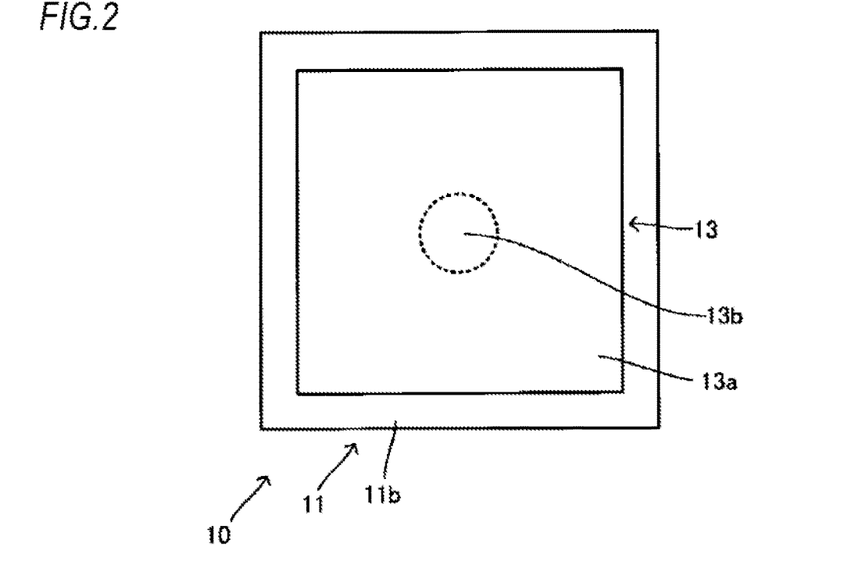
FIG. 2 depicts the receiving part 10, as seen from an A direction in FIG. 1.

As can be seen from FIGS. 1 and 2, the receiving part 10 includes a holding member 11, a buffer member 12, and a contact member 13. The respective members are described, as follows.

The holding member 11 is a member for holding the buffer member 12 and the contact member 13 on the main body 5a of the bracket 5. As can be seen from FIGS. 1 and 2, in the first exemplary embodiment, the holding member 11 of the outboard engine lifting/lowering device 3 has a box shape of which one wall part is opened. The holding member 11 is fixed to the main body 5a with a bottom wall 11a being in contact with the main body 5a. A sidewall 11b is erected in an annular shape from an edge of the bottom wall 11a.

A plan shape of the holding member 11 (a shape from a viewpoint of FIG. 2) is not particularly limited, and may be a circular shape, an elliptical shape, a triangular shape, a polygonal shape or other arbitrary geometric shape, in addition to the quadrangular shape of the first exemplary embodiment.

A material of the holding member 11 is not particularly limited but metal may be used from a standpoint of strength. Specifically, a variety of steel materials including stainless steel, copper, copper alloy, titanium and the like may be exemplified.

Figure 3:
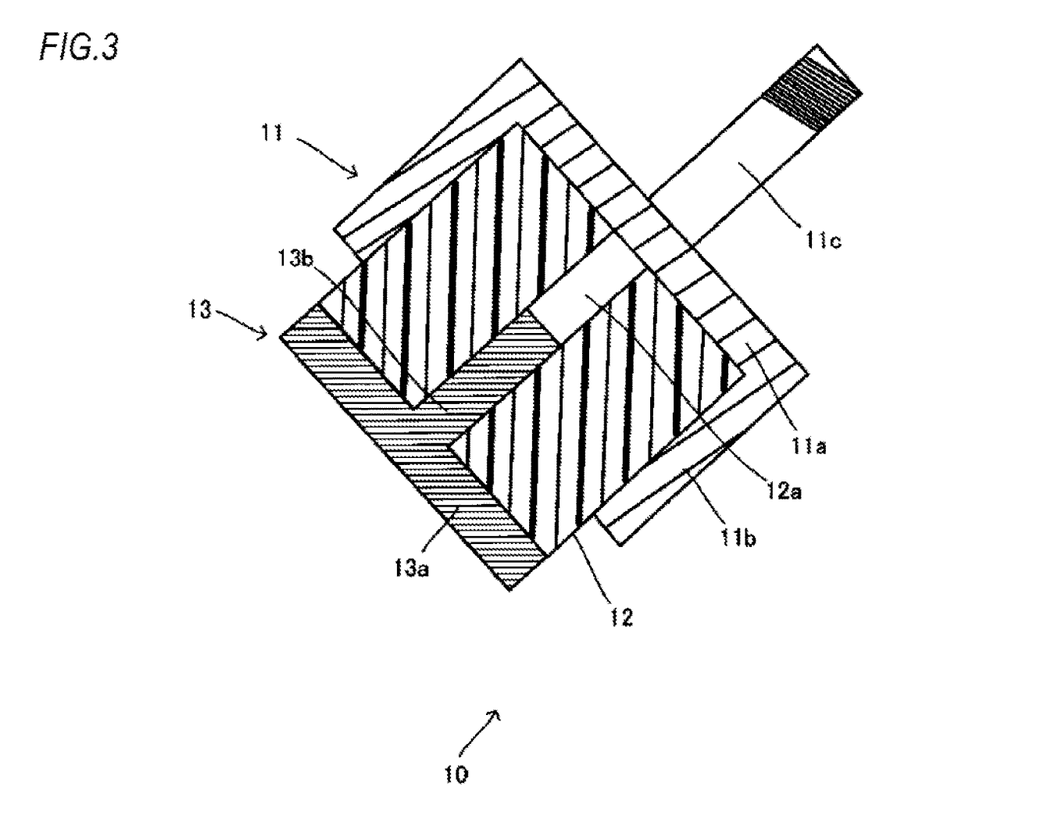
FIG. 3 depicts an example where the receiving part 10 is provided with a male screw 11c.

A means for fixing the holding member 11 to the main body 5a is not particularly limited, and well-known means can be used. For example, as shown in FIG. 3, a male screw part 11c is provided to protrude from a surface, which is opposite to a side at which the buffer member 12 is arranged, of the bottom wall 11a of the holding member 11, and the main body 5a may be sandwiched and fixed by the bottom wall 11a and a nut (not shown). In addition, the holding member 11 may be fixed to the main body 5a by an adhesive.

The buffer member 12 is a member that is arranged inside the box-shaped holding member 11 and is made of a material capable of attenuating applied shock and vibration and difficult to transmit the shock and vibration to adjacent members. Therefore, the member may be configured by a material having a small modulus of elasticity, for example, rubber or resin.

As the rubber, nitrile rubber, urethane rubber, natural rubber, butadiene rubber, and styrene/butadiene rubber may be exemplified from standpoints of wear resistance, mechanical characteristics and the like. Alternatively, from a standpoint of hardness, a material having A40 to A80 measured by a durometer type A in conformity to JIS K6253 may be applied.

In the case of the resin, a variety of general-purpose plastics and engineering plastics can be applied.

In the first exemplary embodiment, the buffer member 12 is formed at its center with a hole 12a. The hole 12a is a hole penetrating the buffer member from the bottom wall 11a-side of the holding member 11 to an opposite side thereto (the contact member 13-side), and a restraint projection 13b of a contact member 13, which will be described later, is accommodated therein.

Figure 4:
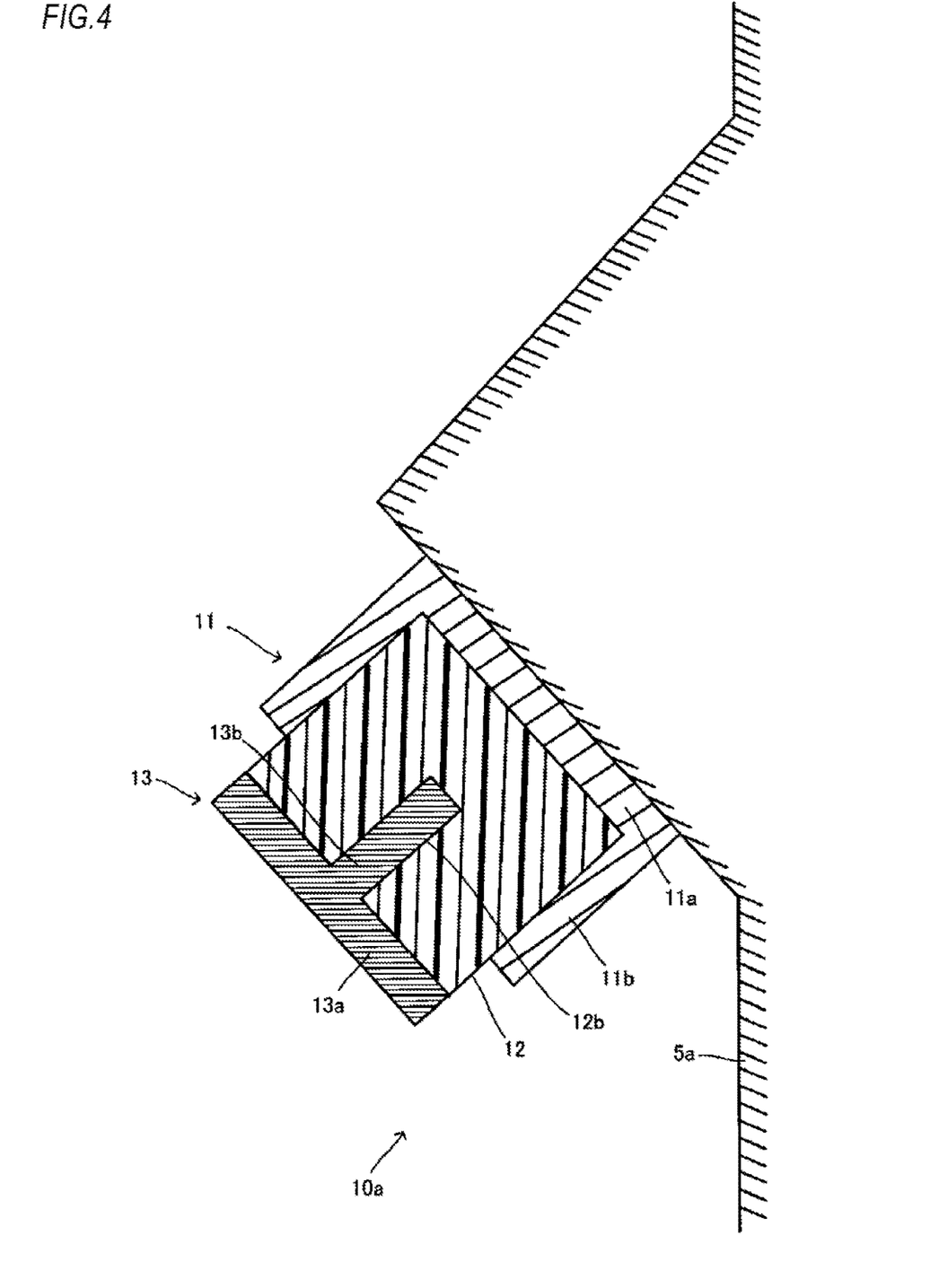
FIG. 4 is a sectional view of a receiving part 10a in a second exemplary embodiment.

In the first exemplary embodiment, the hole 12a is provided, as described above. However, the present invention is not limited thereto. A receiving part 10a of the outboard engine lifting/lowering device according to a second exemplary embodiment is shown in FIG. 4. In FIG. 4, the same configurations as the receiving part 10 are denoted with the same reference numerals shown in FIGS. 1 to 3, and the descriptions thereof are appropriately omitted.

Like the receiving part 10a shown in FIG. 4, the buffer member 12 may be formed with a concave part 12b that does not penetrate the buffer member from the bottom wall 11a-side of the holding member 11 to the opposite side thereto (the contact member 13-side), and a restraint projection 13b of a contact member 13, which will be described later, may be accommodated therein.

Also, the buffer member 12 may have such a size that it fully fills the inside of the box-shaped holding member 11 and protrudes from an opening of the holding member 11 toward an outside of the holding member 11. The buffer member 12 is made to protrude from the holding member 11 in this way, so that it is possible to further efficiently suppress an occurrence of abnormal sound during a trim operation, as described later.

The contact member 13 is a member that is fixed to a surface, which is opposite to a surface in contact with the bottom wall 11a of the holding member 11, of the buffer member 12 and is in direct contact with the tip end of the trim rod 4b to receive the same.

The contact member 13 is made of metal, from standpoints of strength and wear resistance. The metal to be specifically applied is not particularly limited but a variety of steel materials including stainless steel, copper, copper alloy, titanium and the like may be exemplified.

As disclosed in JP-A-H11-227691, in the configuration where the surface for receiving the trim rod (the surface in contact with the trim rod) is arranged thereon with the synthetic resin and the metal (trim rod) and the resin are thus in contact with each other, the resin arranged on the part for receiving the trim rod being slid may be peeled off or the resin may be perforated. If the resin is peeled off or perforated, the abnormal sound increases. Therefore, according to the technology disclosed in JP-A-H11-227691, it is difficult to suppress the occurrence of abnormal sound over a long time.

In the meantime, as disclosed in JP-A-H04-254288, when the metallic end block is swingably provided, the stress is likely to be concentrated on the tip end portion of the ball-shaped trim piston rod, so that the tip end portion is likely to be damaged. Therefore, it is difficult to keep the effect of suppressing the occurrence of abnormal sound over a long time. Also in JP-A-H04-254288, the metallic end block and the resin trim pad are in contact with each other. For this reason, the resin may be peeled off or perforated, so that it is difficult to suppress the occurrence of abnormal sound over a long time.

In contrast, according to the exemplary embodiment, the contact member 13 for receiving the tip end of the trim rod 4b is made of metal. Thereby, it is possible to suppress the occurrence of abnormal sound over a long time.

The contact member 13 has a receiving piece 13a and a restraint projection 13b.

The receiving piece 13a is a plate-shaped piece arranged to cover a surface of the buffer member 12 and configured to directly contact the trim rod 4b.

The restraint projection 13b is a pillar-shaped projection erected from a surface of the receiving piece 13a and is accommodated in the hole 12a of the buffer member 12 or in the concave part 12b (the concave part 12b is shown in FIG. 4; The same applies below).

The method of fixing the contact member 13 to the buffer member 12 is not particularly limited. For example, an adhesive may be used.

The outboard engine lifting/lowering device 3 having the receiving part 10 configured as described above and the outboard engine 1 including the outboard engine lifting/lowering device are operated, as follows, for example.

Figure 5:
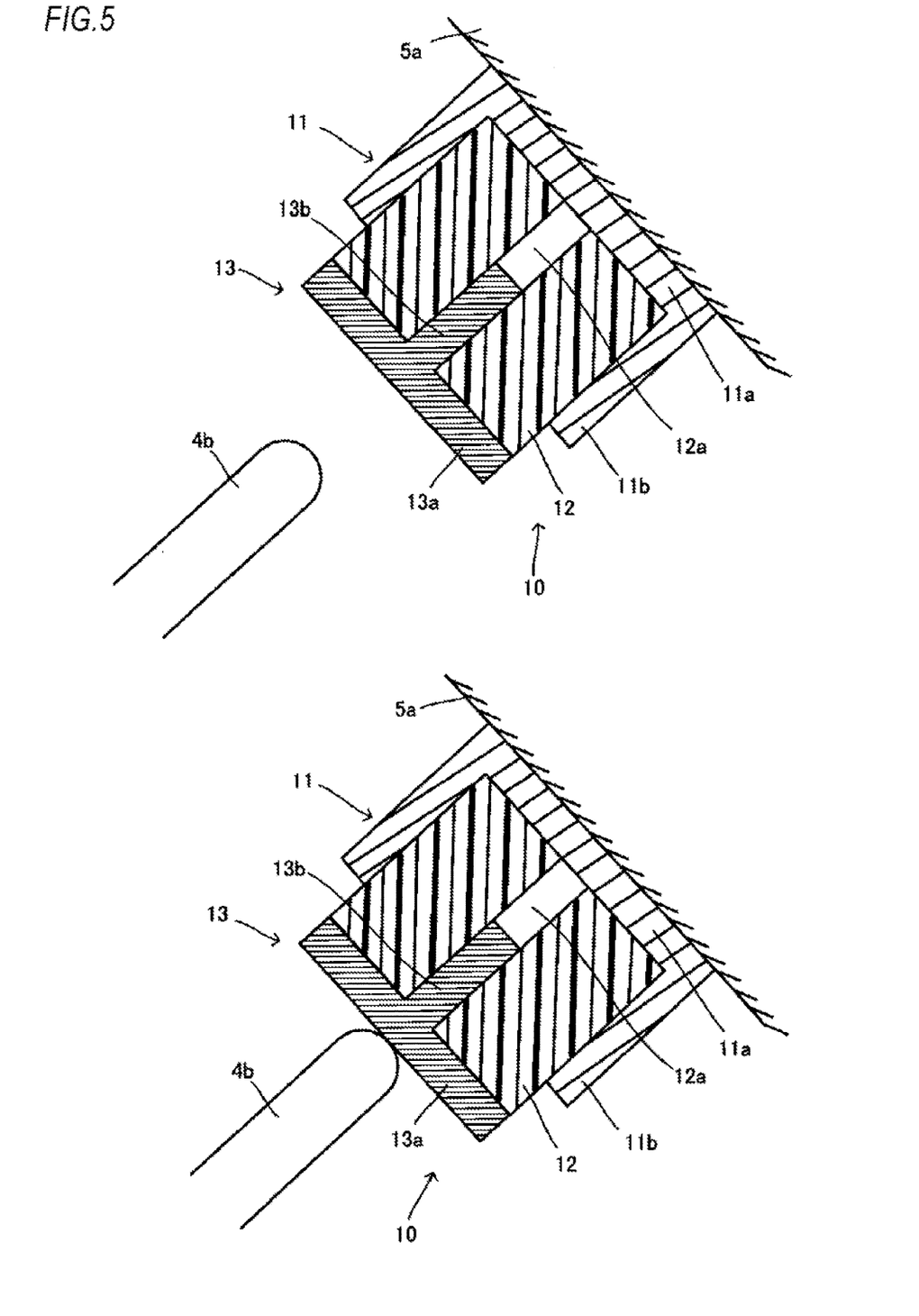
FIG. 5 depicts an abnormal sound that is generated upon tilt.

When the posture is changed from a posture (a so-called tilt-up posture) where the tilt rod 4a is moved upward and the propeller 2b is located above the water surface, as shown in the upper part of FIG. 10, to a posture (a so-called tilt down posture) where the tilt rod 4b is moved downward, the propeller 2b is located in the water and the tip end of the trim rod 4b is in contact with the receiving part 10, as shown in FIG. 9, the state is changed from a state shown in the upper part of FIG. 5 to a state shown in the lower part of FIG. 5, so that the tip end of the trim rod 4b is contacted to the surface of the receiving piece 13a of the contact member 13 provided to the receiving part 10 with a predetermined colliding force.

At this time, the receiving part 10 can absorb the collision by the buffer member 12, thereby reducing a collision sound. Also, since the receiving piece 13a is made of the plate-shaped metal, the receiving part 10 transmits the concentrated colliding force from the tip end of the trim rod 4b to the buffer member 12 while dispersing the colliding force over a wide surface. Thereby, it is possible to further effectively reduce the collision sound, and to increase the durability (strength and wear resistance) even when the collision is repeatedly applied.

Also, when the buffer member 12 is formed with the hole 12a, a space formed by the hole 12a absorbs a change in size due to deformation of the buffer member 12 upon the collision of the trim rod 4b, thereby contributing to the absorption of the colliding force.

Meanwhile, in the state where the propeller 2b is rotated to apply the propulsive force at the posture shown in FIG. 9, when performing a so-called trim operation of changing the posture from the posture shown in FIG. 9 to the posture shown in the lower part of FIG. 10, the trim rod 4b presses the receiving part 10 against the propulsive force and a contact angle between the trim rod 4b and the receiving piece 13a is changed. Therefore, as shown with an arrow B in FIG. 6, the tip end of the trim rod 4b is slid on the surface of the receiving piece 13a and an abnormal sound may be generated at this time. That is, when the tip end of the trim rod 4b is slid on the surface of the receiving piece 13a, a predetermined repetitive change (which may be referred to as repetitive attachment and sliding with respect to a frictional surface, stick slip or chattering vibration) is generated in the sliding speed, thereby making the abnormal sound.

Figure 6:
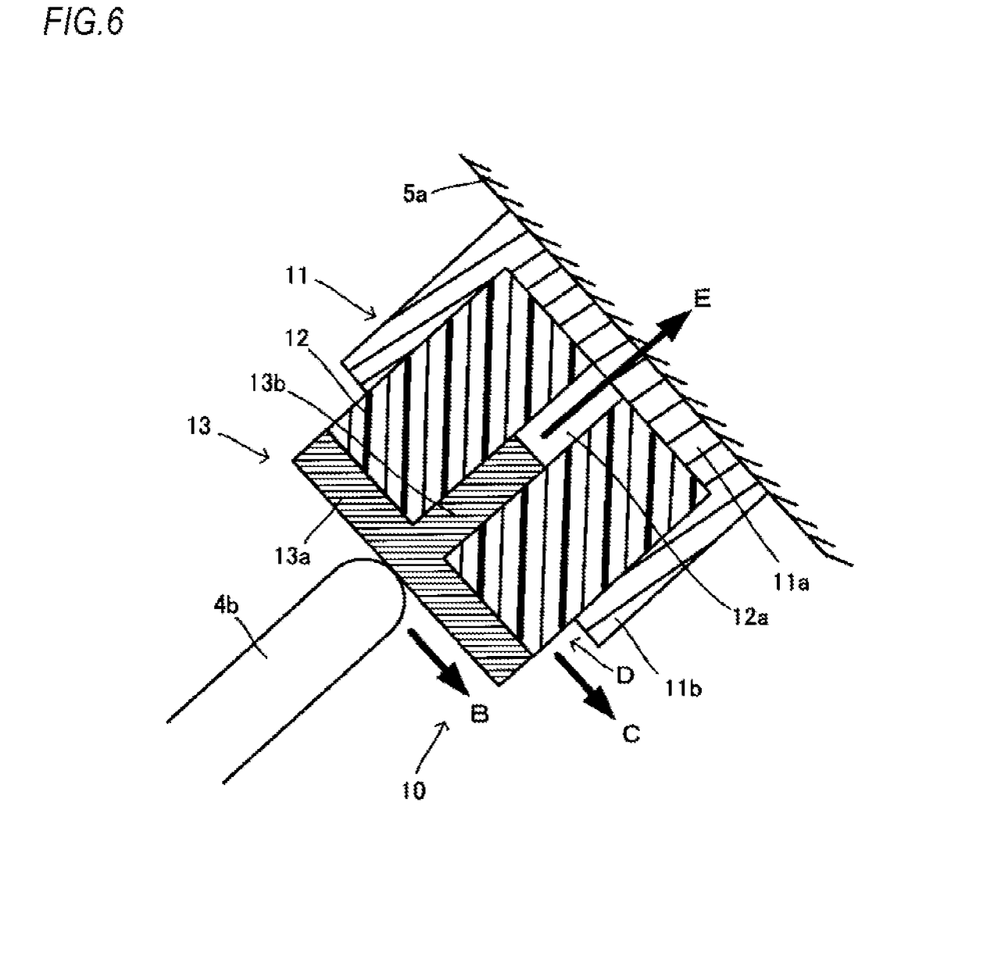
FIG. 6 depicts an abnormal sound that is generated upon trim.

In contrast, according to the receiving part 10, the buffer member 12 absorbs the vibration so as not to cause the above phenomenon, so that it is possible to suppress the occurrence of abnormal sound.

Here, in the configuration where the buffer member 12 is formed with the hole 12a or the concave part 12b and the restraint projection 13b of the contact member 13 is accommodated therein, it is possible to increase deformation compliance of the buffer member 12 in a direction shown with an arrow C, with respect to the force in a direction of an arrow B, and to improve the effect of suppressing the occurrence of abnormal sound.

Likewise, in the configuration where the buffer member 12 is made to protrude from the holding member 11 (refer to the part denoted with a reference numeral D in FIG. 6), it is possible to increase deformation compliance of the buffer member 12 in the direction shown with the arrow C, with respect to the force in the direction of the arrow B, and to improve the effect of suppressing the occurrence of abnormal sound.

Also, during the trim operation, the receiving piece 13a is pressed against the propulsive force by the trim rod 4b, so that the force is applied in a direction of an arrow E in FIG. 6. Thereby, the buffer member 12 is deformed, so that the contact member 13 is moved in the direction of the arrow E. In the configuration where the restraint projection 13b is provided, the contact member is restrained from moving beyond a position at which the restraint projection 13b is to contact the bottom wall 11a of the holding member 11. Thereby, it is possible to prevent the excessive deformation of the buffer member 12.

Figure 7:
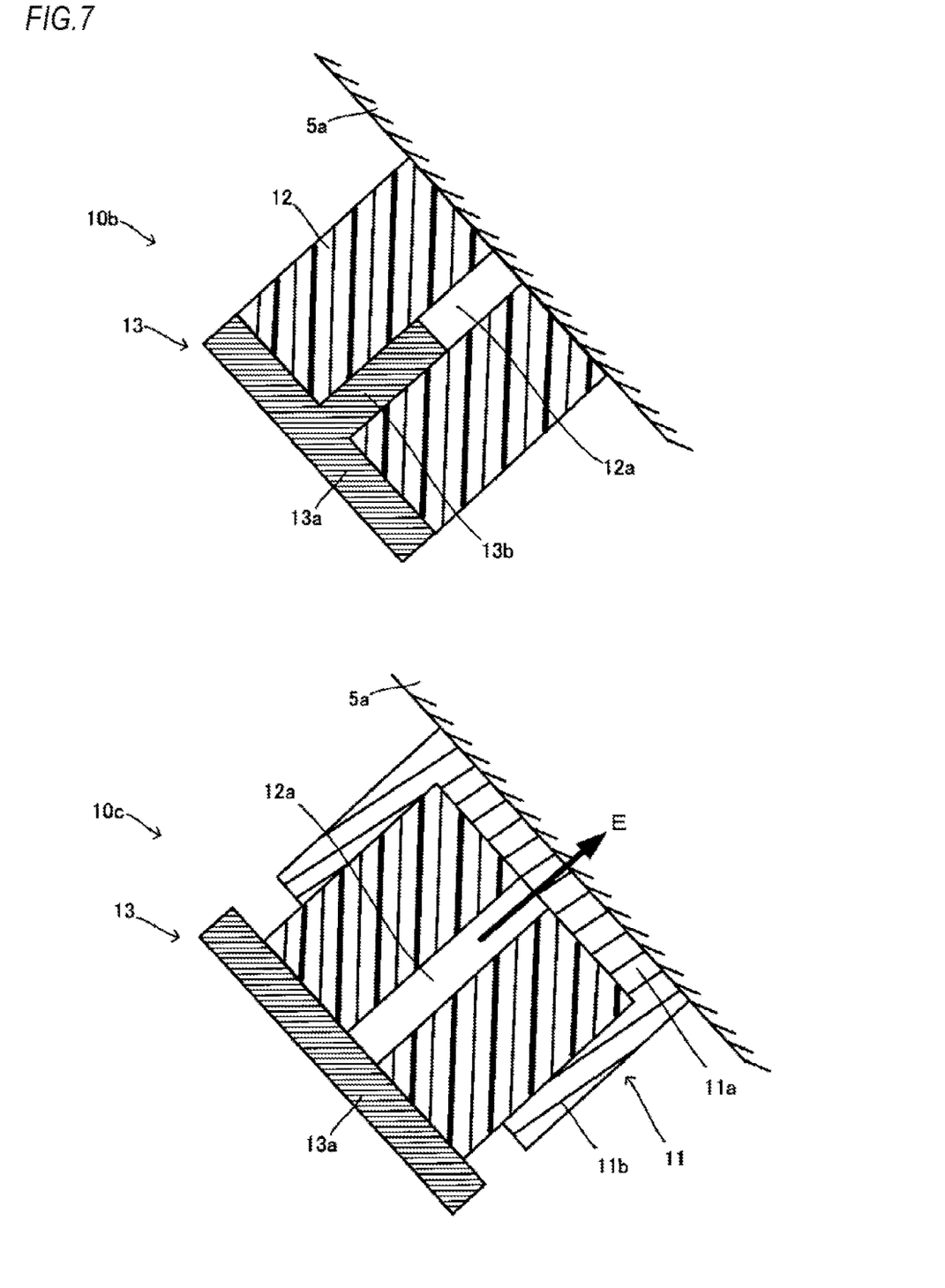
FIG. 7 illustrates a receiving part 10b in a third exemplary embodiment, and a receiving part 10c in a fourth exemplary embodiment.
Figure 8:
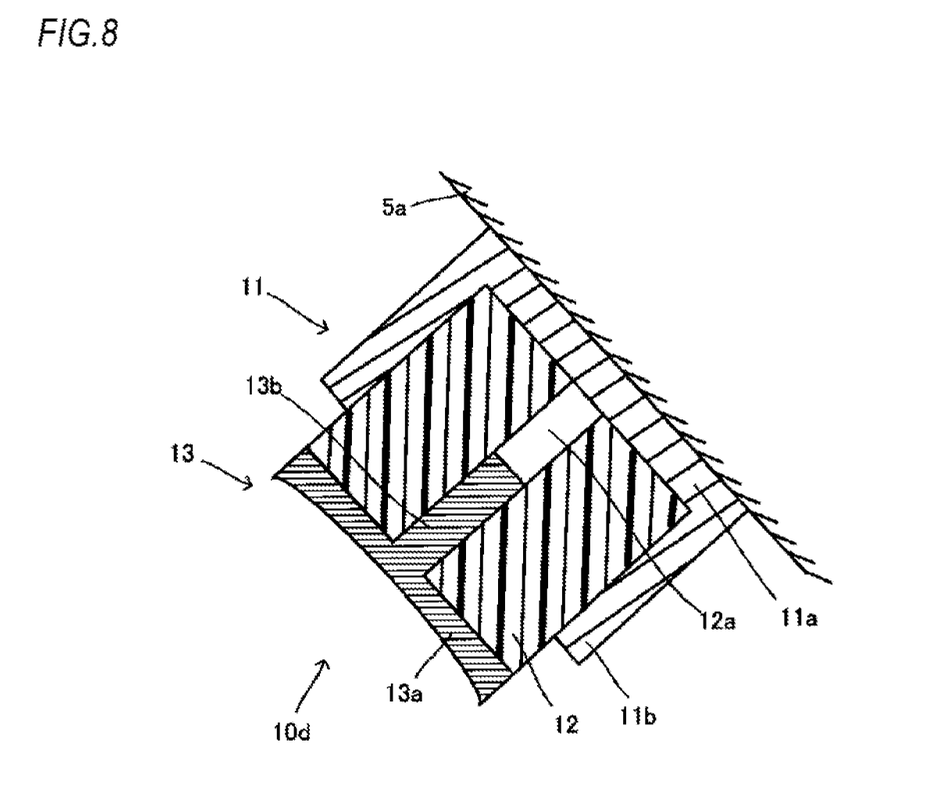
FIG. 8 illustrates a receiving part 10d in a fifth exemplary embodiment.

A receiving part 10b provided to the outboard engine lifting/lowering device in a third exemplary embodiment and a receiving part 10c provided to the outboard engine lifting/lowering device in a fourth exemplary embodiment are shown in FIG. 7, and a receiving part 10d provided to the outboard engine lifting/lowering device in a fifth exemplary embodiment is shown in FIG. 8. In FIGS. 7 and 8, the same configurations as the receiving part 10 are denoted with the same reference numerals as those in FIGS. 1 to 3, and the descriptions thereof are appropriately omitted. FIGS. 7 and 8 are views, as seen from the same viewpoint as FIG. 7. Even when the receiving parts 10b, 10c, 10d shown in FIGS. 7 and 8 are applied, it is possible to increase the strength and wear resistance of the contact part between the tip end of the trim rod and the receiving part while suppressing the occurrence of abnormal sound during the tilt and during the trim.

The receiving part 10b shown in the upper part of FIG. 7 is not provided with the holding member 11. The buffer member 12 of the receiving part 10b is directly fixed to the main body 5a of the bracket 5.

In the case of the receiving part 10c shown in the lower part of FIG. 7, the contact member 13 is configured only by the receiving piece 13a without the restraint projection 13b, and the receiving piece 13a is formed larger than the buffer member 12. Therefore, the receiving piece 13a of the receiving part 10c protrudes with respect to the buffer member 12. Thereby, during the deformation in the direction shown with the arrow E in FIG. 7, like the arrow E in FIG. 6, the protruding part of the receiving piece 13a is caught at the holding member 11, so that the further deformation is prevented. Therefore, it is possible to prevent the excessive deformation of the buffer member 12 by the same function as the restraint projection 13b.

In this exemplary embodiment, it is not necessarily required that the buffer member 12 is provided with the hole 12a or the concave part 12b.

In the case of the receiving part 10d shown in FIG. 8, a surface, with which the trim rod 4b is in contact, of the surfaces of the receiving piece 13a is a curved surface. Specifically, the surface is formed as a concave curved surface so that a central part of the receiving piece 13a is deeper and an outer peripheral part is shallower. Thereby, during the trim operation, since the curved surface acts in a direction of keeping the direction of force constant with respect to the change in contact angle between the trim rod 4b and the surface of the receiving piece 13a, the smoother sliding is performed, so that it is possible to further suppress the occurrence of abnormal sound due to the stick slip.

The respective forms of the present disclosure are not limited to the above exemplary embodiments, and the constitutional elements can be modified and embodied without departing from the gist thereof. Also, a variety of forms can be made by appropriate combinations of the plurality of constitutional elements disclosed in the above exemplary embodiments. Some constitutional elements may be omitted from all the constitutional elements disclosed in the above exemplary embodiments.

Hereinafter, the present disclosure is described. For easy understanding, the reference numerals denoted in the drawings are described in parentheses.

According to an aspect of the present disclosure, there is provided an outboard engine lifting/lowering device (3) including: a bracket (5) which is to be rotatably provided to a hull (9) and which is to be fixed to a propulsion device (2); and a rod unit (4) which includes a tilt rod (4a) and a trim rod (4b) that are configured to rotate the propulsion device and the bracket, wherein the bracket is provided with a receiving part (10, 10a, 10b, 10c, 10d) configured to receive a tip end of the trim rod, and the receiving part includes: a buffer member (12) made of a resin or rubber; and a contact member (13) made of metal, which is provided on a surface of the buffer member at a side at which the trim rod is arranged, and which is in contact with the tip end of the trim rod.

A surface of the contact member (13), which faces the buffer member (12), may be provided with a projection (13b), and the buffer member may be formed in the surface which faces the contact member with a concave part configured to be concave so as to accommodate therein the projection or a hole configured to accommodate therein the projection.

A holding member (11) may be provided on a surface of the buffer member (12), which is opposite to the surface of the buffer member on which the contact member (13) is provided.

The holding member (11) may have a box shape of which one wall part is opened, and the buffer member (12) may be arranged in the box shape.

A surface of the holding member (11), which is opposite to a surface thereof at which the buffer member (12) is arranged, may be provided with a pillar-shaped male screw (11c).

A surface of the contact member (13), with which the trim rod (4b) is in contact, may be a concave curved surface.

According to another aspect of the present disclosure, there is provided an outboard engine (1) including: the outboard engine lifting/lowering device (3), and the propulsion device (2) attached to the bracket (5) of the outboard engine lifting/lowering device.

According to the present disclosure, it is possible to provide the outboard engine lifting/lowering device and the like capable of suppressing a sound to be generated upon contact over a long time while securing strength and wear resistance at the contact part between the tip end of the trim rod and the receiving part.

What is claimed is:
1. An outboard engine lifting/lowering device comprising:
a bracket which is to be rotatably provided to a hull and which is to be fixed to a propulsion device; and
a rod unit which includes a tilt rod and a trim rod that are configured to rotate the propulsion device and the bracket, wherein
the bracket is provided with a receiving part configured to receive a tip end of the trim rod,
the receiving part includes:
a buffer member made of a resin or rubber; and a contact member made of metal, which is provided on a surface of the buffer member at a side at which the trim rod is arranged, and which is in contact with the tip end of the trim rod, a holding member is provided on a surface of the buffer member, which is opposite to the surface of the buffer member on which the contact member is provided, and the holding member has a box shape of which one wall part is opened, and the buffer member is arranged in the box shape.

2. The outboard engine lifting/lowering device according to claim 1, wherein a surface of the contact member, with which the trim rod is in contact, is a concave curved surface.

3. An outboard engine comprising:

the outboard engine lifting/lowering device according to claim 1; and the propulsion device attached to the bracket of the outboard engine lifting/lowering device.

4. The outboard engine lifting/lowering device according to claim 1, wherein a surface of the holding member, which is opposite to a surface thereof at which the buffer member is arranged, is provided with a pillar-shaped male screw.

5. The outboard engine lifting/lowering device according to claim 4, wherein a surface of the contact member, which faces the buffer member, is provided with a projection, and the buffer member is formed in the surface which faces the contact member with a concave part configured to be concave so as to accommodate therein the projection or a hole configured to accommodate therein the projection.

6. The outboard engine lifting/lowering device according to claim 1, wherein a surface of the contact member, which faces the buffer member, is provided with a projection, and the buffer member is formed in the surface which faces the contact member with a concave part configured to be concave so as to accommodate therein the projection or a hole configured to accommodate therein the projection.

7. An outboard engine lifting/lowering device comprising:

a bracket which is to be rotatably provided to a hull and which is to be fixed to a propulsion device; and a rod unit which includes a tilt rod and a trim rod that are configured to rotate the propulsion device and the bracket, wherein the bracket is provided with a receiving part configured to receive a tip end of the trim rod, the receiving part includes:

a buffer member made of a resin or rubber; and a contact member made of metal, which is provided on a surface of the buffer member at a side at which the trim rod is arranged, and which is in contact with the tip end of the trim rod, a holding member is provided on a surface of the buffer member, which is opposite to the surface of the buffer member on which the contact member is provided, and a surface of the holding member, which is opposite to a surface thereof at which the buffer member is arranged, is provided with a pillar-shaped male screw.

8. The outboard engine lifting/lowering device according to claim 7, wherein a surface of the contact member, with which the trim rod is in contact, is a concave curved surface.

9. An outboard engine comprising:

the outboard engine lifting/lowering device according to claim 7; and the propulsion device attached to the bracket of the outboard engine lifting/lowering device.

10. The outboard engine lifting/lowering device according to claim 7, wherein a surface of the contact member, which faces the buffer member, is provided with a projection, and the buffer member is formed in the surface which faces the contact member with a concave part configured to be concave so as to accommodate therein the projection or a hole configured to accommodate therein the projection.

* * * * *